Figure 1:
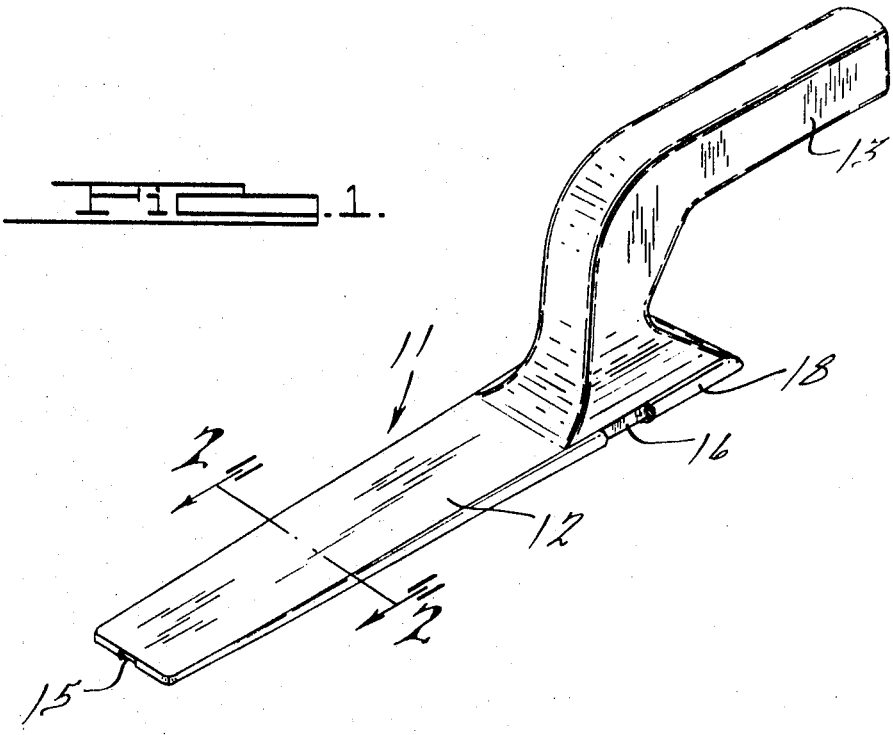
Figure 2:
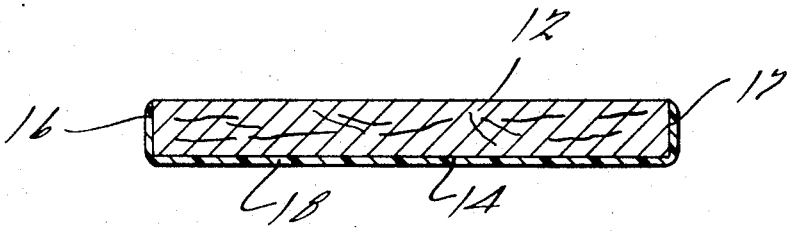

T866032

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 30, 1969

866 O.G. 1438

756,771
HAND IMPLEMENT WITH POLYMERIC MATERIAL COATED SURFACE
John M. Pietila, Detroit, Mich., assignor to Ford Motor Company, Dearborn, Mich., a corporation of Delaware
Filed Sept. 3, 1968. Published Sept. 30, 1969
Int. Cl. B23k *37/06;* B05c *11/02*
U.S. Cl. 228—57
1 Sheet Drawing. 3 Pages Specification

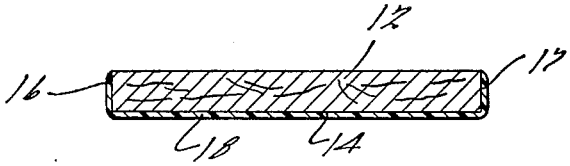

A wooden hand tool for spreading, shaping or smoothing molten solder. The molten solder engaging surface 14 is coated with a heat stable polymeric material 18 to which the solder is nonadherent.

T866032

Sept. 30, 1969 J. M. PIETILA 756771 DEF. PUB.

HAND IMPLEMENT WITH POLYMERIC MATERIAL COATED SURFACE

Filed Sept. 3, 1968

INVENTOR.
John M. Pietila
BY
John R. Faulkner
John J. Roethel
ATTORNEYS.